METHOD FOR MANUFACTURING MICROMINIATURE COILS

Filed Nov. 24, 1964 Sheet 1 of 2

INVENTORS
KEISKE YAWATA
MASAMICHI SHIRAISHI
BY HIROSHI SHIBA
Hopgood & Calimafde
ATTORNEYS

METHOD FOR MANUFACTURING MICROMINIATURE COILS

Filed Nov. 24, 1964 Sheet 2 of 2

INVENTORS
KEISKE YAWATA
MASAMICHI SHIRAISHI
HIROSHI SHIBA
BY Hopgood & Calimafde
ATTORNEYS United States Patent Office 3,431,144
Patented Mar. 4, 1969

3,431,144

METHOD FOR MANUFACTURING MICROMINIATURE COILS

Keiske Yawata, Masamichi Shiraishi, and Hiroshi Shiba, Tokyo, Japan, assignors to Nippon Electric Company Limited, Tokyo, Japan, a corporation of Japan Filed Nov. 24, 1964, Ser. No. 413,445
Claims priority, application Japan, Dec. 26, 1963, 38/70,382
U.S. Cl. 117—212 1 Claim
Int. Cl. H01f *27/28;* H01c *7/00;* C23c *13/00*

ABSTRACT OF THE DISCLOSURE

A helical coil of the order of 1 mm. in diameter is made by (a) Arranging in an enclosure a vapor source of conductive material and a vapor source of insulating material spaced from a substrate with an apertured mask in between a shield between the vapor sources, (b) Evacuating the enclosure, (c) Producing rotation between the substrate and the sources, and (d) Heating the sources to cause the vapor source materials to pass through selected apertures in the mask and continually deposit on the substrate and alternately on each other to form the coil.

This invention relates to a method of manufacturing microminiature coils, which coils are particularly suitable for use as inductors or transformers in integrated circuits, micromodules and the like.

Various types of very small coils are available for use in electronic apparatus such as electronic computers, communications equipment, and so forth and these have been made by winding the conductor mechanically or by forming the coils on insulating substrates using evaporation and photoengraving techniques, both with and without cores, as desired. The mechanically wound coils and the photoengraved coils, however, have the disadvantages of either large volume or small inductance. A large inductance may be achieved by mechanical winding techniques, but the dimensions of the coil cannot be reduced so as to be used in integrated circuit applications. By the evaporation and photoengraving techniques, however, the coils may be formed on a semiconductor substrate as part of an integrated circuit, but the inductance is so small that the range of application is severely limited. If a small coil having dimensions comparable to those of other components in an integrated circuit may be produced having an inductance so large as to be used in any common electronic circuit, the coil will of course have wide application.

Accordingly, it is an object of this invention to provide a method for manufacturing a microminiature inductive coil at a desired location in an integrated circuit which has dimensions comparable to those of other components in the circuit.

It is a further object of the invention to provide a method for manufacturing a plurality of microminiature inductive coils in a continuous operation, the number and the uniformity of the coils being limited only by the distances and dimensions of the manufacturing apparatus.

A still further object of the invention is to provide a method for manufacturing a microminiature transformer on a substrate.

It is yet another object of the invention to provide a method for manufacturing a microminiature inductive coil having a core of magnetic material.

Figure 1:
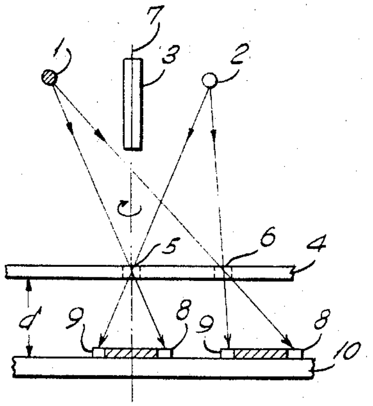
Figure 2:
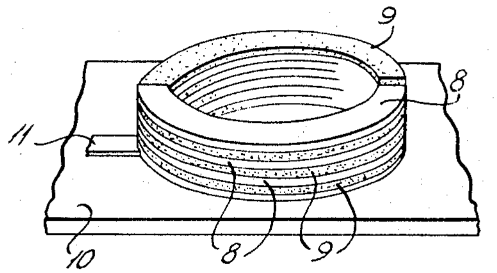
Figure 3:
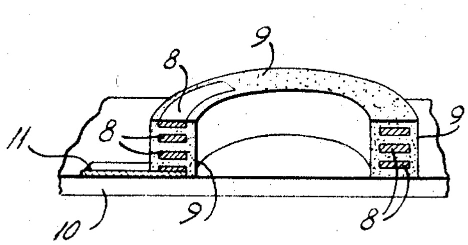
Figure 4:
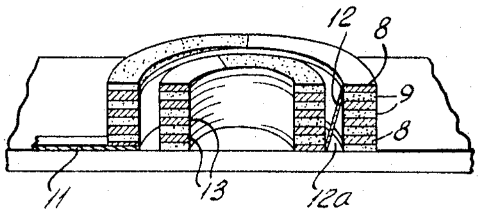
Figure 5:
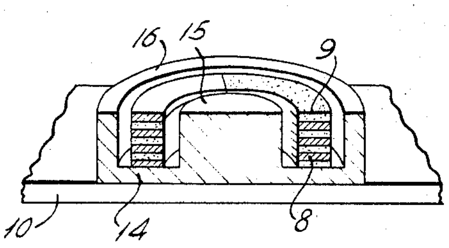
Figure 6:
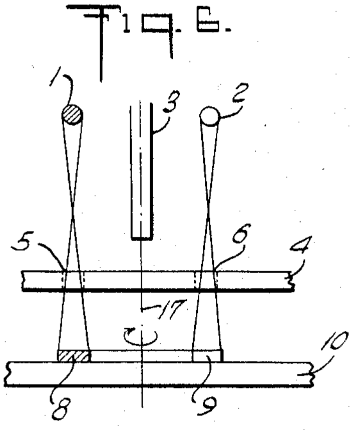
Figure 7A:
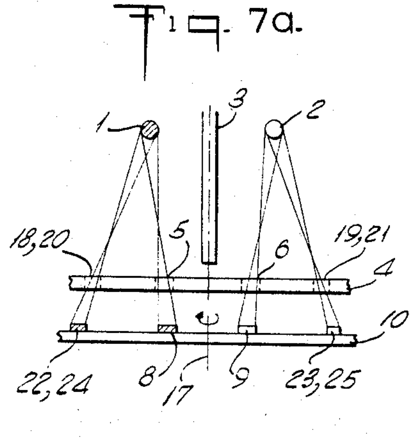
Figure 7B:
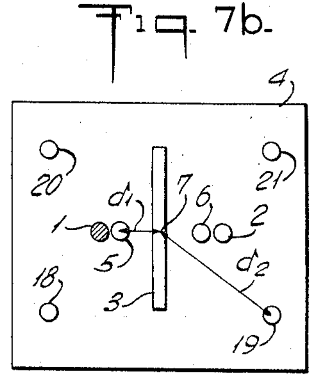
Figure 7C:
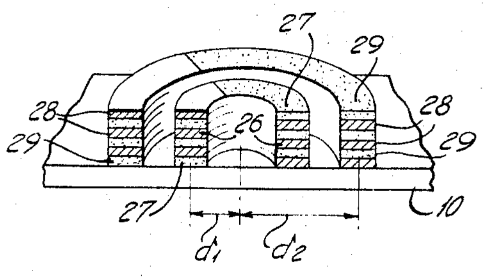
Figure 8A:
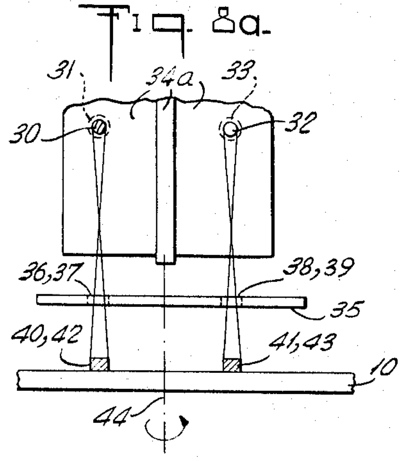
Figure 8B:
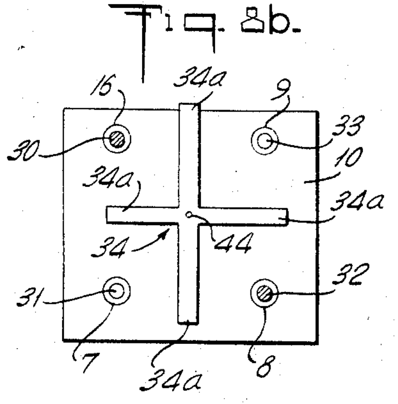
Figure 8C:
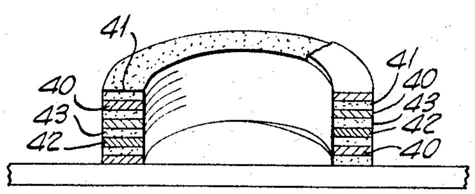

All of the objects, features and advantages of this invention and the manner of attaining them will become more apparent and the invention itself will be best understood by reference to the following description of an embodiment of the invention taken in conjunction with the accompanying drawing, in which FIG. 1 shows apparatus which illustrates the principles of the present invention, FIG. 2 is a view of a microminiature inductive coil formed in accordance with the invention, FIG. 3 is a sectional view of a microminiature inductive coil formed in accordance with the invention, FIG. 4 is a sectional view of a microminiature coil having two layers of spiral deposit formed in accordance with the invention, FIG. 5 is a sectional view of a coil surrounded by a magnetic material and formed in accordance with the invention, FIG. 6 shows further apparatus which illustrates the principles of the invention, FIGS. 7*a* and 7*b* show in principle a sectional view and a plan view, respectively, of an apparatus used in making a multi-layer coil or a transformer in accordance with the invention, FIG. 7*c* is a sectional view of a microminiature coil having two layers of spiral deposit formed in accordance with the embodiment shown in FIGS. 7*a* and 7*b*, FIGS. 8*a* and 8*b* show in principle a sectional view and a plan view, respectively, of still another apparatus according to the invention, and FIG. 8*c* is a sectional view of a microminiature coil made in accordance with the apparatus of FIGS. 8*a* and 8*b*.

The present invention provides a method of manufacturing a coil with dimensions less than 1 millimeter in diameter and less than 100 microns in height. The method also makes possible manufacture of a plurality of layers of concentric spiral deposits at the same time, which may be connected in series to form a multiple layer coil, or which may be connected in such a way as to form a transformer. Further according to the invention, a plurality of single or multi-layer coils may be provided at preselected locations on a substrate. The inductance of the coils may be substantially increased by depositing a magnetic material of high permeability in selected regions adjacent the coils.

The invention is characterized by the use of the well known vacuum evaporation technique which utilizes a conductor vapor source and an insulator vapor source disposed at a suitable position over a substrate, and a mask or a plurality thereof, having a desired configuration and desired opening dimensions. Either the sources or the substrate may be rotated at a fixed velocity around a fixed axis. If the substrate is rotated the mask may be rotated therewith while fixed at a suitable distance from the substrate in order to limit the paths of the evaporated conductor and insulator therethrough. If the sources are to be rotated, they should be rotated in such a way that each of the evaporated substances are deposited continuously on top of one another, resulting in a spiral of conductor material separated by the insulating material between consecutive conductor turns. If the substrate is to be rotated, a shield should be provided between the two sources, and between openings of the mask for each source so that the evaporating substance from one source will not interfere with that from the other source in the course of evaporation, but instead deposits only through the corresponding openings of the mask. Also, the substrate should be rotated in such a way that both deposits are situated on an identical circumference to produce a spiral conductor separated by insulating material between consecutive conductor turns.

It is preferable to hold the sources fixed with the mask secured to the substrate at a suitable distance therefrom, while the mask and substrate are rotated. The results are the same as in the case where the sources are rotated, because the relative motion between the sources and the fixture holding the mask and the substrate is the same, however, the evaporation apparatus will be much simpler when the substrate and mask are rotated.

Considering the invention now in greater detail, reference is first made to FIG. 1 which shows apparatus in schematic form for making microminiature inductive coils according to the invention, this apparatus being contained within an air tight enclosure, such as a bell jar, not shown. In the schematic representation of FIG. 1, there is provided a vapor source 1 of conducting material, such as silver, copper, gold or the like, and another vapor source 2 of insulating material, such as silicon oxide, calcium fluoride, magnesium fluoride, zinc sulfide, or the like. Each of the sources 1 and 2 is provided with means, not shown, for heating to a temperature at which a suitable vapor pressure of the source substance exists to evaporate the same. A shield 3 prevents deposition of the evaporative substance from each source on the other. A mask 4, having openings 5, 6 and the like therethrough, is provided to limit the paths of the evaporating substance. The number and position of the openings depends on the desired configuration of the coils to be formed on the substrate 10. The mask 4 is fixed to the substrate 10 at a suitable distance therefrom by means of a suitable supporting fixture, not shown, and these are rotated about an axis 7 at a fixed velocity to produce a plurality of deposits 8, 9, etc., of conductor and insulator, respectively, on identical circumferences on the substrate 10. In this configuration, if the axis 7 is chosen to divide in half the distance between the sources 1 and 2 so as to give one deposit on top of another when the fixture is rotated half way around the axis 7, a continuous rotation will give a spiral deposit of the conductor material 8 insulated by a spiral of the insulator material 9 as shown in FIG. 2. A terminal lead 11 is also shown in FIG. 2. The spiral conductor 8 is deposited on the substrate 10 with the insulator 9 between each two consecutive turns of the conductor. The deposit of the conductor 8 starts at the position where the terminal lead 11 has been deposited so that the lead 11 is connected to the starting end of the spiral deposit 8. If the insulator source 2 is considerably larger than the conductor source 1 in its diameter, the deposit 9 of the insulator will cover the deposit 8 of the conductor as shown in FIG. 3. As will be apparent to those skilled in the art, by selecting suitable configurations and dimensions of the openings and the distances between the sources and the mask, and between the mask and the substrate, it is possible to make a plurality of coils with a desired inductance in one operation.

Reference is now made to FIG. 4, which shows a microminiature coil having two layers formed in accordance wtih the invention. This structure is made by first depositing the outer spiral coil layer comprising the turns 8 and 9. Next the distance between the conductor and insulator sources 1 and 2 and the rotation axis is changed, or if desired, the ratio of the distance between these sources and the mask to that between the mask and the substrate is changed, in such a manner that the deposit 12 is formed without shorting out the spiral deposit 8. A short circuit is prevented by the deposition of insulating material **12*a* beneath the deposit 12. The deposit 12 connects the end of the spiral conductor deposit of the outer layer to the starting end of the inner layer. By resuming rotation of the substrate-mask fixture after suitable repositioning of the sources 1 and 2, the inner layer 13 of spiral deposit will be formed. By repeating this process many layers of spiral deposit may be formed, thus obtaining a very large inductance for the size of the coil, compared wtih that obtainable in the prior art. If the two spiral deposits are formed without the connecting deposit 12**, they may be used as primary and secondary windings of a transformer.

In FIG. 5, there is shown a microminiature inductive coil surrounded by a magnetic material and having a magnetic code. This structure may be made by covering the substrate 10 with a magnetic material 14, preferably having a high permeability. If desired, unwanted portions of the deposit may be removed such as for example, by photoengraving, after which one or more coil layers may be deposited on top of the prepared magnetic material 14, these layers comprising the conductor deposits 8 and the insulator deposits 9. The magnetic material is then deposited over the coil to form a magnetic core 15 and a magnetic enclosing layer 16.

Instead of rotating the fixture which supports the mask 4 and the substrate 10, the substrate alone may be rotated as indicated in FIG. 6, wherein the conductor source 1 and the insulator source 2 are fixed. The shield 3 is provided so that the evaporated conductor material passes only through the opening 5 of the mask 4 and the evaporated insulator passes only through the opening 6 thereof, the distance between the mask 4 and the substrate 10 being fixed. The substrate 10 is rotated about an axis 17 which is so positioned that the deposits 8 and 9 are located on an identical circumference having its center at the intersection of the axis 17 with the substrate 10. As the substrate 10 is rotated, the apparatus being arranged as described above, the evaporated conductor and insulator will deposit on the substrate 10, the locus of the conductor deposit tracing that of the insulator deposit. Thus a coil of the conductor will be deposited on the substrate 10 with the insulator insulating each turn of the spiral deposit from its adjacent turn.

If there are more than six openings in the mask instead of two as shown in FIG. 6, a plurality of layers of spiral deposit will be formed. In the apparatus arranged as shown in FIGS. 7*a* and 7*b*, wherein the conductor source 1 and the insulator source 2 are fixed, the mask 4 has openings 5, 6, 18, 19, 20 and 21. The openings 5 and 6 are located an equal distance $d_1$ from the axis 17 and the openings 18, 19, 20 and 21 are located an equal distance $d_2$ from the axis 17 which is different from $d_1$ by more than the width of the resulting layer. The shield 3 prevents the evaporating conductor from passing through the openings 6, 19 and 21 and the evaporating insulator from passing through the openings 5, 18 and 20. The substrate 10 is rotated around the axis 17 at a fixed velocity. The numerals 8, 22 and 24 indicate the resulting conductor deposits and the numerals 9, 23 and 25 indicate the resulting insulator deposits. FIG. 7*c* shows the coil thus made, wherein inner and outer coil layers are shown on the substrate 10. The conductor deposits 22 and 24 through the openings 18 and 20 form a spiral deposit 28, the conductor deposit 8 through the opening 5 form a spiral deposit 26, the insulator deposits 23 and 25 through the openings 19 and 21 form an insulator 29 and the insulator deposit 9 throught the opening 6 forms an insulator 27. The distance from the axis of the coil to the center of the inner layer 26–27 is $d_1$ and that from the axis of the coil to the center of the outer deposit 28–29 is $d_2$.

A bifilar deposit may be achieved by providing two conductor sources, two insulator sources, a mask and a shield disposed as shown in FIGS. 8*a* and 8*b*. In these figures two conductor sources 30 and 32 and two insulator sources 31 and 33 are shielded from each other by a shield 34 having four wings **34*a*, the sources 30, 31, 32 and 33 being disposed an equal distance from an axis 44 around which the substrate 10 is rotated. A mask 35 is provided with openings 36, 37, 38 and 39 therethrough, each of which is disposed in this order under the sources 30, 31, 32 and 33, respectively. The shield 34 restricts the path of the vapor from the sources 30, 31, 32, 33 upon evaporation to the vicinity of the opening under each source so that the vapor from each source passes only through its corresponding opening. If the substrate 10 is held stationary and each source is evaporated, conductor deposits 40 and 42 and insulator deposits 41 and 43 will be disposed in numerical order on the substrate. Upon rotation of the substrate 10 around the axis 44** at a fixed velocity a bifilar deposit will be obtained as shown in FIG. 8*c* wherein the substrate 10 has the deposits 40, 41, 42 and 43, the deposits 40 and 42 being conductors insulated by the deposits 41 and 43. By providing the starting and finishing ends with deposited terminal leads in advance of the coil formation, upon completion thereof a transformer with bifilar windings will have been produced.

What is claimed is:

1. A method for making a microminiature inductive coil comprising steps of placing on a substrate a pair of concentric mounted radially spaced cylindrically shaped magnetic materials extending axially upwardly from a flat magnetic material layer in contact with the substrate, said magnetic layer being concentric with the cylindrically shaped magnetic materials, positioning about an axis angularly separated conductive and insulating material vapor sources in axially parallel vapor depositing alignment with an apertured mask and with the axis concentric with the annulus formed between the pair of cylindrically shaped magnetic materials, said mask having an aperture in depositing alignment with each of the vapor sources and the annulus, continuously rotating the substrate with the cylindrical magnetic materials concentric with said axis, simultaneously depositing on said flat magnetic layer within the annulus fully over-lapping alternating continuous layers of conductive and insulating mamaterial to form a coil concentrically with said cylindrical materials.

References Cited

UNITED STATES PATENTS

| | | | |
|---|---|---|---|
| 2,740,928 | 4/1956 | Ward | 117—106 X |
| 2,517,105 | 8/1950 | Greer | 336—186 X |
| 3,081,201 | 3/1963 | Koller | 117—215 X |
| 3,113,040 | 12/1963 | Winston | 117—215 X |
| 3,117,025 | 1/1964 | Learn et al. | 118—49 |
| 3,148,085 | 9/1964 | Weigmann | 117—212 |

ALFRED L. LEAVITT, *Primary Examiner.*

ALAN GRIMALDI, *Assistant Examiner.*

U.S. Cl. X.R.

29—602; 117—106, 215; 336—225; 338—300